April 1, 1952     W. P. WESTBY ET AL     2,590,909
VEGETABLE CUTTER
Filed Oct. 8, 1948
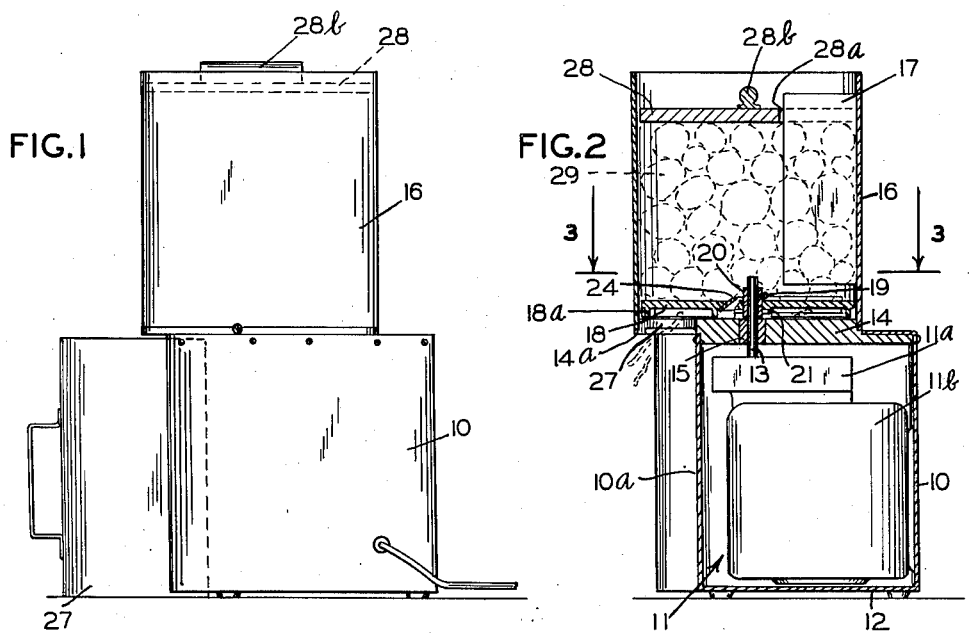
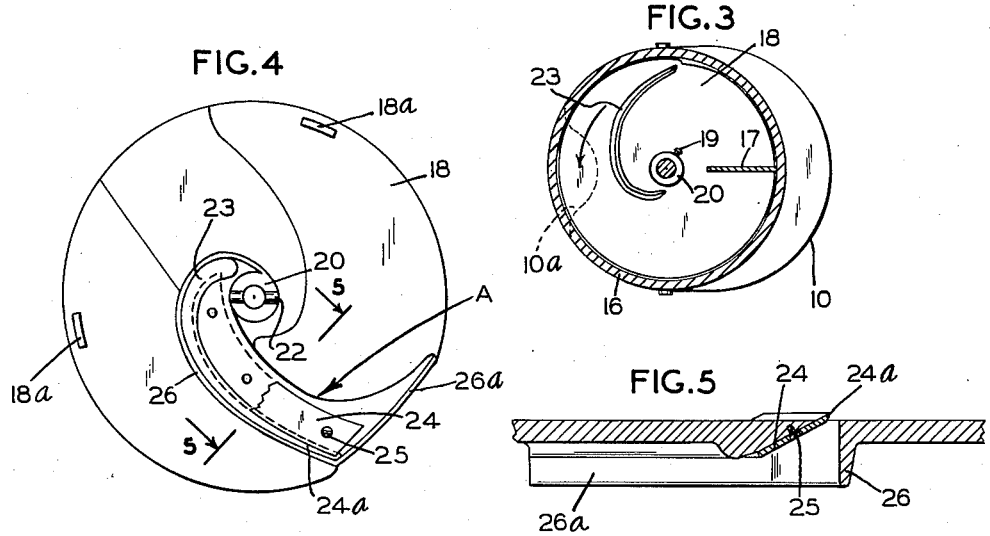
INVENTORS
MAYNARD P. HANSON
WALTER P. WESTBY
BY Williamson & Williamson
ATTORNEYS Patented Apr. 1, 1952

2,590,909

UNITED STATES PATENT OFFICE 2,590,909

VEGETABLE CUTTER

Walter P. Westby and Maynard P. Hanson, Minneapolis, Minn.; said Westby assignor to said Hanson Application October 8, 1948, Serial No. 53,508

1 Claim. (Cl. 146—125)

This invention relates to slicing machines for vegetables, fruits and other natural and prepared solid foods and is an improvement upon the machine disclosed in the copending application of the present applicant, Maynard P. Hanson, Serial Number 675,617, now abandoned.

It is an object of the instant invention to provide an efficient, high capacity slicing machine of improved construction, especially adapted for slicing of vegetables and solid food products and employing a very efficient slicing action through the cooperation of a peculiarly curved revolving knife element with an upstanding radial partition and a confining casing or container.

A further object is the provision of an efficient vegetable slicer for restaurant and home use which is compact in structure, produces a well defined and clean cut and which can be readily dissembled, washed or sterilized.

A further and more specific object is the provision of a comparatively simple vegetable slicer wherein a slicing knife is fixedly carried by a revolving disc which also serves as the bottom of a hopper or article container and wherein said slicing knife is curved and related with such disc and a stationary cooperating abutment, providing resistance to slicing in such manner that the leading portions of the curved blade cut or shear most advantageously in operation.

Another important object is the provision of a vegetable slicer of the class described wherein the revolving slicing disc furnishes or carries a distributor arm curved in conformance with the slicing knife for centrifugally urging the cut slices to a point of distribution eccentrically located with respect to the casing.

These and other objects and advantages of our invention will more fully appear from the following description made in connection with the accompanying drawings wherein like reference characters refer to similar parts throughout the several views and in which:

Fig. 1 is a side elevation of an embodiment of our invention showing a receiving container applied to the discharge of the machine;

Fig. 2 is a vertical section taken axially of the slicing disc with the receiver indicated in dotted lines;

Fig. 3 is a cross section taken on the line 3—3 of Fig. 2;

Fig. 4 is a bottom plan view of the slicing disc removed showing the material-distributing arm;

Fig. 5 is a fragmentary vertical section taken on the line 5—5 of Fig. 4 showing the relation of the slicing knife with its receiving slot and distributor arm.

As illustrated in the accompanying drawings, an improved slicing machine is shown having a suitable casing 10 for the driving mechanism 11 including the gear box 11a with reduction gears therein and driving motor 11b. The motor 11b is mounted on a suitable motor support 12, and the casing 10 has a receptacle receiving recess 10a formed at the front thereof. A drive shaft 13 is mounted in upstanding position in gear box 11a and is driven at a predetermined speed by the reduction gears therein. A hopper base 14 is fixed to the top of casing 10 and is supported thereby. An annular flange 14a is formed around the periphery of the raised circular platform portion of said base 14 to produce a hopper abutment support, the circular portion of base 14 defined by flange 14a forming the subdivided food distribution platform. A suitable bearing 15 is provided in base 14 for journaling shaft 13, and the shaft 13 extends a substantial distance thereabove.

A cylindrical hopper 16 is removably mounted around the circular platform of base 14 and is supported by the flange 14a and extends upwardly therefrom. A radially disposed inwardly extending partition 17 is fixed to the inner wall of cylindrical hopper 16 and extends inwardly to within a slight distance of the center of said hopper and upwardly to substantially the top thereof and downwardly to within a slight distance above the disc 18. A horizontally disposed rotary disc 18 is adapted to be fixed on the upwardly extending portion of shaft 13 as by set screw 19 through a sleeve 20 which is centrally fixed to said disc and integrally formed therewith. A driving key 21 is transversely fixed to shaft 13 at a point disposed immediately above the hopper bottom and the bottom of sleeve 20 has a cross groove 22 formed therein adapted to cooperate with key 21 to form a driving connection between disc 18 and shaft 13. A plurality of depending peripheral flanges 18a are formed around the periphery of disc 18 to ride on base 14 only if the downward pressure produces sufficient strain on the body of the disc and thereby limit the distortion of said disc.

As best shown in Figs. 3, 4, and 5, a curved slicing knife is provided in form A of our invention, and a curved slot 23 conforming to the curvature of the cutting edge of the knife is formed in the disc 18. This slot 23 follows a curved path from a point near the outer periphery of the disc inwardly across an intermediate portion thereof to a point near the disc center on the opposite side thereof, as is best shown in Fig. 3. This curved slot has a knife positioning surface extending angularly downwardly along the trailing edge portion thereof which is adapted to receive a curved knife 24 in fixed relation thereto and position the same angularly relative to the top surface of said disc. The curved cutting edge 24a of knife 24 of course extends upwardly a slight distance above the top surface of said disc, and the knife 24 is fixed in cutting position to the disc as by machine screws 25. A distributor arm 26 extends downwardly in depending relation to the disc and is formed in fixed relation thereto along the leading edge of the slot 23 and is substantially co-extensive therewith for the full length thereof and conforms to the curvature thereof. The depending distributor arm 26 extends beyond outer end of slot 23 along the curved peripheral edge portion of the disc to form a discharge flange 26a. A discharge recess 27 is formed in the outer edge portion of the platform of base 14 directly above the receptacle recess 10a to permit the food slices to be discharged therethrough into a suitable open-topped receptacle 27a as best shown in Fig. 1 which is adapted to be received in recess 10a directly below the discharge recess 27.

The following is a description of the operation of this improved food slicer. The food to be sliced is placed in the hopper 16 and is supported on the top surface of disc 18. There is a slight clearance between the bottom of food stop or partition 17 and the top of disc 18 to prevent clogging or danger of engagement of the knife edge 24a thereagainst. When the hopper has been loaded, the weight of the load will generally be sufficient to maintain contact between the articles on the bottom of the pile and the cutting edge 24a, but if not, a vertically slidable piston 28 having a radial slot 28a formed in one side thereof to slidably receive partition 17 and a handle 28b is provided to permit downwardly directed pressure to be exerted on the food in the hopper 16. As the disc 18 and the knife 24 are rotated, the food, such as the potatoes 29, which are shown in Fig. 2, engages the food stop or partition 17 which prevents shifting thereof and thus permits the knife edge 24a to efficiently slice the potatoes which are disposed in the bottom of the hopper 16. The slices pass downwardly across the inclined face of the knife into the space between the disc 18 and the top of the platform on base 14. The peculiarly curved cutting edge 24a of the cutting blade 24 and slot 23 works in close combination and cooperation with the partition 17 and cylindrical hopper 16 to produce a particularly efficient slicing action.

When the slices reach the top surface of the base 14, they will shift only slightly with the rotation of the disc until they are engaged by the curved distributing arm 26, at which time they will be carried outwardly toward the periphery of the disc, both by centrifugal force and the curved shape of the arm 26 to be discharged into the recess 27, the peripheral flange 26a providing positive ejection of the slices into said recess and therethrough into the receptacle 27a where they are collected.

It will be seen that we have provided an extremely simple yet highly efficient slicing machine adapted for use in the home as well as in restaurants for subdividing fruits, vegetables, and other solid foods in which the hopper and food engaging disc which come in contact with the food may be easily dissembled to facilitate complete cleaning thereof. The hopper is merely removed from base 14, set screw 19 loosened, and the disc removed to permit any of the food engaging parts to be cleaned.

It will, of course, be understood that various changes may be made in the form, details, arrangement and proportions of the parts without departing from the scope of our invention.

What we claim is:

A slicing machine for vegetables and the like, said machine comprising a vertically extending hopper having a substantially cylindrical lower portion, a stationary flat platform at the bottom of said hopper having a discharge recess therein extending inwardly from the periphery thereof, an integrally cast rotary disc having a spirally curved narrow slot therein extending from a point near the periphery thereof inwardly to a point near the central part of the disc and having a spirally curved food distributing arm on the bottom thereof conforming generally to the shape of said slot and located directly adjoining a side wall of the slot, the inner side face of said distributor arm forming a downward continuation of the side face of the adjoining side wall of said slot, said disc being disposed in slightly spaced relation above said platform to provide a distributing space between the platform and the disc in which said distributor arm rotates, and a cutter fixed against the side wall of said slot opposite the first mentioned side wall thereof and extending upwardly above the upper face of the disc, the cutter having a spiral cutting edge conforming generally to the spiral form of said slot and said distributor arm, whereby material in said hopper may be sliced by said spiral cutter and discharged downwardly onto said platform to be subsequently urged centrifugally by said distributor arm into said discharge recess in the platform.

WALTER P. WESTBY.
MAYNARD P. HANSON.

REFERENCES CITED

The following references are of record in the file of this patent:

UNITED STATES PATENTS

| Number | Name | Date |
|---|---|---|
| 195,681 | White | Sept. 25, 1877 |
| 918,320 | Hess | Apr. 13, 1909 |
| 1,964,437 | Klein | June 26, 1934 |
| 2,265,658 | Welander | Dec. 9, 1941 |